United States Patent [19]
Marchio et al.

[11] 3,909,831
[45] Sept. 30, 1975

[54] FLUID APPLICATING DEVICE

[75] Inventors: Douglas R. Marchio, Concord; David N. Mayfield, San Carlos, both of Calif.

[73] Assignee: Levi Strauss & Co., San Franciso, Calif.

[22] Filed: Feb. 14, 1974

[21] Appl. No.: 442,496

[52] U.S. Cl. .................... 346/140; 118/7; 318/696
[51] Int. Cl.² .................... G01D 15/16; G01D 9/40
[58] Field of Search ........... 346/140; 318/696, 685, 318/604; 118/7; 33/1 M

[56] References Cited
UNITED STATES PATENTS

| | | | |
|---|---|---|---|
| 2,082,591 | 6/1937 | Newman | 346/140 X |
| 2,977,180 | 3/1961 | Zenner | 346/140 |
| 3,510,878 | 5/1970 | Johnson | 346/75 X |
| 3,610,119 | 10/1971 | Gerber et al. | 354/4 |
| 3,781,907 | 1/1972 | Gerber | 346/140 |

FOREIGN PATENTS OR APPLICATIONS

| | | | |
|---|---|---|---|
| 637,462 | 5/1950 | United Kingdom | 346/140 |

*Primary Examiner*—Joseph W. Hartary
*Attorney, Agent, or Firm*—Limbach, Limbach & Sutton

[57] ABSTRACT

In an automated drafting machine of the type having a tip which is moved on a plotting surface and supplied with fluid from a reservoir, signals from the plotting device which are representative of the velocity of the tip movement in the orthogonal X and Y directions are combined in a vectorial summing unit to produce an output signal representative of the magnitude of the instantaneous vectorial velocity of the tip on the plotting surface and means responsive to the vector sum output signal control a motor driven pump to positively supply fluid from the reservoir to the tip at a flow rate substantially in proportion to the vector velocity of the movement of the tip over the plotting surface.

5 Claims, 9 Drawing Figures

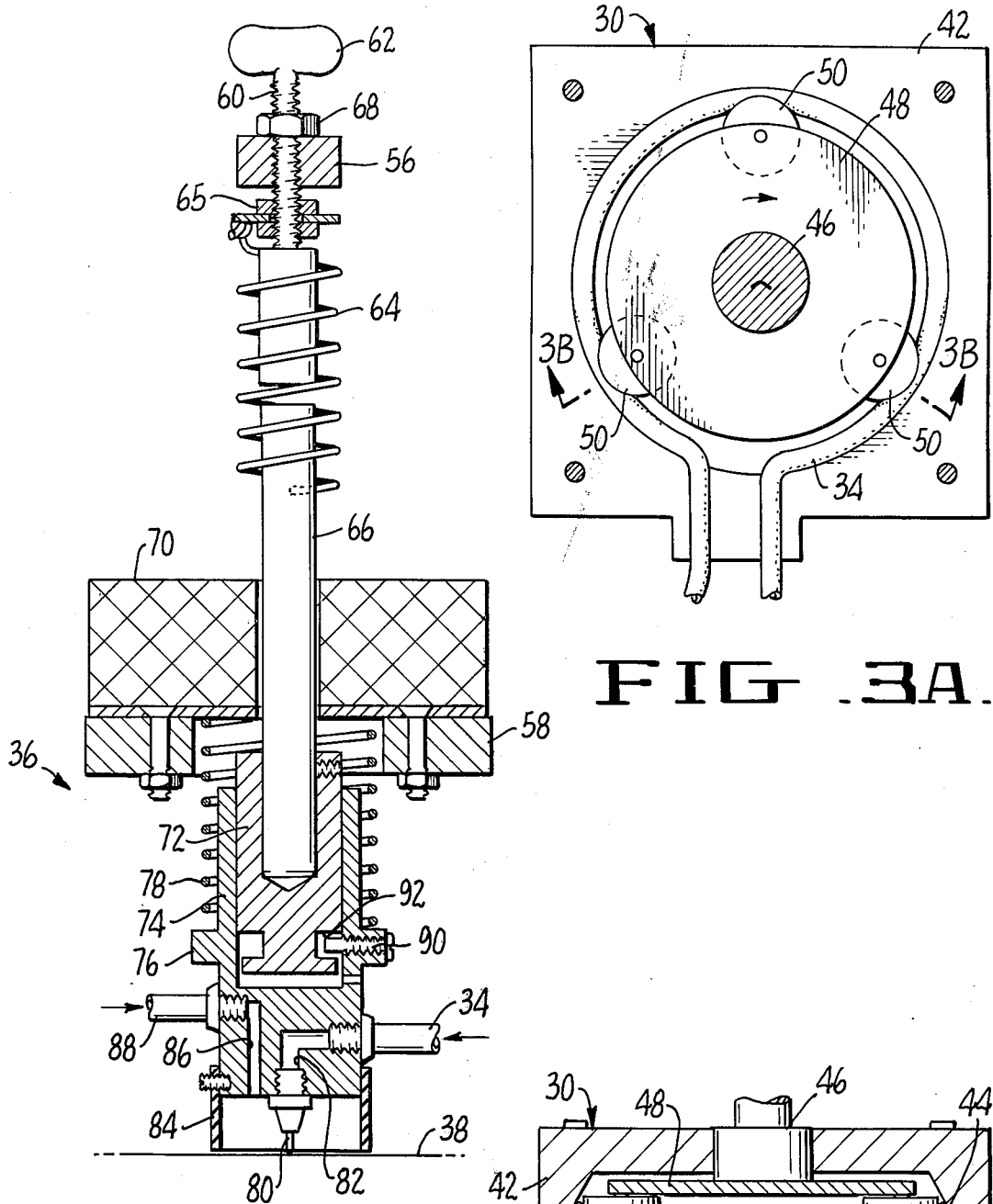
FIG. 3.
FIG. 3A.
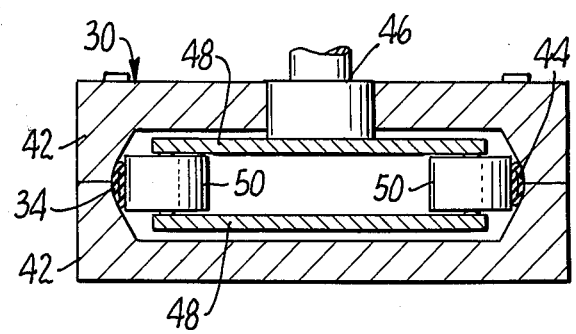
FIG. 3B.

FLUID APPLICATING DEVICE

BACKGROUND OF THE INVENTION

The invention relates to an automated plotting device and more particularly to a fluid applicating device for such an automated plotter.

In the garment industry, it is sometimes desirable for automatic plotters to lay out pattern forms which are then used to reproduce other patterns by ink transferral techniques. In one prior art method, an X-Y plotter under computer control moves a ball point pen over a hectographic carbon paper plotting surface which transfers an ink image to an underlying paper. The transferred image on the underlying paper, representing the garment pattern, is then used to reproduce a number of other patterns by an ink transferral technique. One problem with this technique is that the hectographic carbon paper interferes with the plotting device resulting in dimension errors on the transferred image. Furthermore, the hectographic carbon paper is relatively expensive and may only be reused a limited number of times.

It is therefore desirable to directly plot the pattern image with an ink which is suitable for ink transferral processes. One problem with this approach is that the type of ink which is suitable for this ink transferral process is relatively viscous and is therefore difficult to supply to the tip at a flow rate sufficient to accommodate a rapid tip movement over the plotting surface. Various types of prior art methods have attempted to overcome this problem without success. In one such method the wetting or capillary action between the fluid on the pen tip and the plotting surface over which it moves is used to supply fluid to the tip. This approach is extremely inadequate for anything other than very slow systems.

Still another approach takes two digital pulse train signals representative of the velocity of the orthogonal X and Y directions and approximates their vector sum by simply adding them together with a logic AND gate. This approach gives moderately satisfactory results when the pen travels in either the X and Y direction but leads to a maximum error of almost 41 percent when the pen tip is moving at an angle of 45° across the plotting surface.

Still another approach uses a digital sampling technique in which the magnitudes of the frequencies of the two signals representing velocity of the pen tip in the X and Y directions derived from the plotter are counted and their magnitudes are compared in storage registers. Using digital logic, one-third the magnitude of the smaller component is added to the larger of the two components. The resultant magnitude is then supplied to a storage register. As the sampling process continues, the computation is repeated and the contents of the output storage register are updated. Finally, the contents of the output register are converted into a signal having a frequency that can operate a stepper motor driven pump. This process leads to a mathematically computed maximum error of 5 percent when the pen is moving at an angle of 45° across the plotting surface. While this error is acceptable in and of itself, the real problem lies in choosing a sampling rate which will allow adequate accuracies at both low and high pen velocities. Thus, the error due to sampling could amount to considerably more than the predicted 5 percent. Because of the sampling rate problem, the approach is limited to a relatively narrow velocity range.

In still another approach, the back pressure on the fluid reservoir is varied proportionally with the pen tip velocity. This approach, however, only works effectively with fluids of a certain range of viscosity.

SUMMARY OF THE INVENTION

The above and other disadvantages are overcome by the present invention of an improved fluid applicating device for use with an automated drafting machine of the type wherein fluid from a reservoir is applied to a plotting surface through a tip whose position is controlled by a programmed force, wherein the improvement of the invention comprises means for receiving and converting separate signals representative of the tip velocity in orthogonal X and Y directions, means for vectorially summing the signals to produce an output signal representative of the magnitude of the instantaneous victorial velocity of the tip on the plotting surface, means responsive to the vector sum output signal for positively supplying fluid from the reservoir to the tip at a flow rate substantially in proportion to the vector velocity of the movement of the tip over the plotting surface. By the terms "substantially proportional" is meant a fixed relationship such as a direct proportionality, for example. In some embodiments, however, this fixed relationship can be non-linear.

In one preferred embodiment the X and Y tip velocity input signals are separate digital pulse trains whose frequencies are proportional to the tip velocity over the plotting surface in the X and Y directions respectively. Separate frequency to voltage converters are supplied with these X and Y digital pulse train signals to generate separate $V_x$ and $V_y$ output (analog) signals whose magnitudes are proportional to the respective frequencies of the pulse trains. The $V_x$ and $V_y$ signals are supplied to a vector summing means which produces an output signal $V_z$ whose magnitude is equal to the square root of the sum of the squares of the output signals $V_x$ and $V_y$.

In effect, then, the vector summing means produces an output signal whose magnitude is derived by the Pythagorian theorem and gives a true measure of the diagonal velocity of the pen tip as a function of the $V_x$ and $V_y$ velocity coordinates. The vector sum output signal is scaled and supplied to a voltage to frequency converter which generates a digital pulse train driving signal whose frequency is proportional to the magnitude of the output signal $V_z$. The digital pulse train driving signal is fed to a bipolar chopper which operates a stepper motor driven pump.

The pump is a rotary squeeze pump in which the fluid being pumped is pressed positively through a plastic tube by a number of rollers connected to a shaft driven by the stepper motor. The flow goes directly from the fluid reservoir to the pump and finally to the fluid applicating tip. Thus, instant fluid response is obtained at the fluid tip.

In the preferred embodiment, the applicating tip assembly can be lifted up or down by a solenoid when it is desired not to make a plotting line. Furthermore, when the tip assembly is lowered to the plotting surface it is slidable relative to the solenoid to accommodate unevenness in the plotting surface. In some embodiments the applicating tip during the plotting is levitated from the plotting surface by a cushion of air or by a magnetic field.

Since there is a minimum amount of fluid between the tip and the pump and the pump is a positive displacement action type with very little fluid pulsation, the invention is relatively insensitive to fluid viscosity. The pump is driven by a very high performance stepper motor and real-time signals so that there is theoretically very little limit to the maximum fluid flow driver (electronic) rate given the pen velocity or acceleration used in the plotter devices on the market today. Thus, one problem with some prior art techniques known as "overshoot", which occurs when the fluid applicating tip comes to a rapid halt, is avoided because the control of the fluid is broken down into very fine measures to maintain flow accuracy during rapid acceleration or deceleration. Furthermore, fluid drip during so-called dry-haul periods, when the tip is lifted from the plotting surface, is also decreased.

In more involved embodiments, different tip indexing systems are utilized to continue a plot with different width lines. Either remotely or manually, different size or different fluid tips can be rotated into the same position and different motor driven pumps may also be switched into the system.

It is, therefore, an object of the present invention to provide a positive displacement action type fluid applicating device for use with an automated plotter;

It is another object of the invention to provide a fluid applicating device in which fluid is supplied to the tip at a rate proportional to the applicating tip velocity over the plotting surface;

It is still another object of the invention to provide a fluid applicating device in which fluid is supplied to a plotting tip at a rate proportional to the tip velocity over the plotting surface but whose rate may be varied from a proportional relationship if more or less flow rate is desired as the applicating tip starts accelerating from zero;

It is still a further object of the invention to provide a fluid applicating device, for use with an automated plotter, which is insensitive to the chemistry, density, or viscosity of the fluid which is being applied to the plotting surface.

The foregoing and other objectives, features and advantages of the invention will be more readily understood upon consideration of the following detailed description of certain preferred embodiments of the invention, taken in conjunction with the accompanying drawings.

BRIEF DESCRIPTION OF THE DRAWINGS

FIG. 3 is an enlarged vertical view in section of the fluid applicating tip assembly of the embodiment of FIG. 1;

FIG. 3A is an enlarged, horizontal view, partly in section of the rotary squeeze pump of the embodiment of the invention depicted in FIG. 1;

FIG. 3B is a vertical view in section taken generally along the line 3B—3B of FIG. 3A;

DETAILED DESCRIPTION OF CERTAIN PREFERRED EMBODIMENTS

Figure 1:
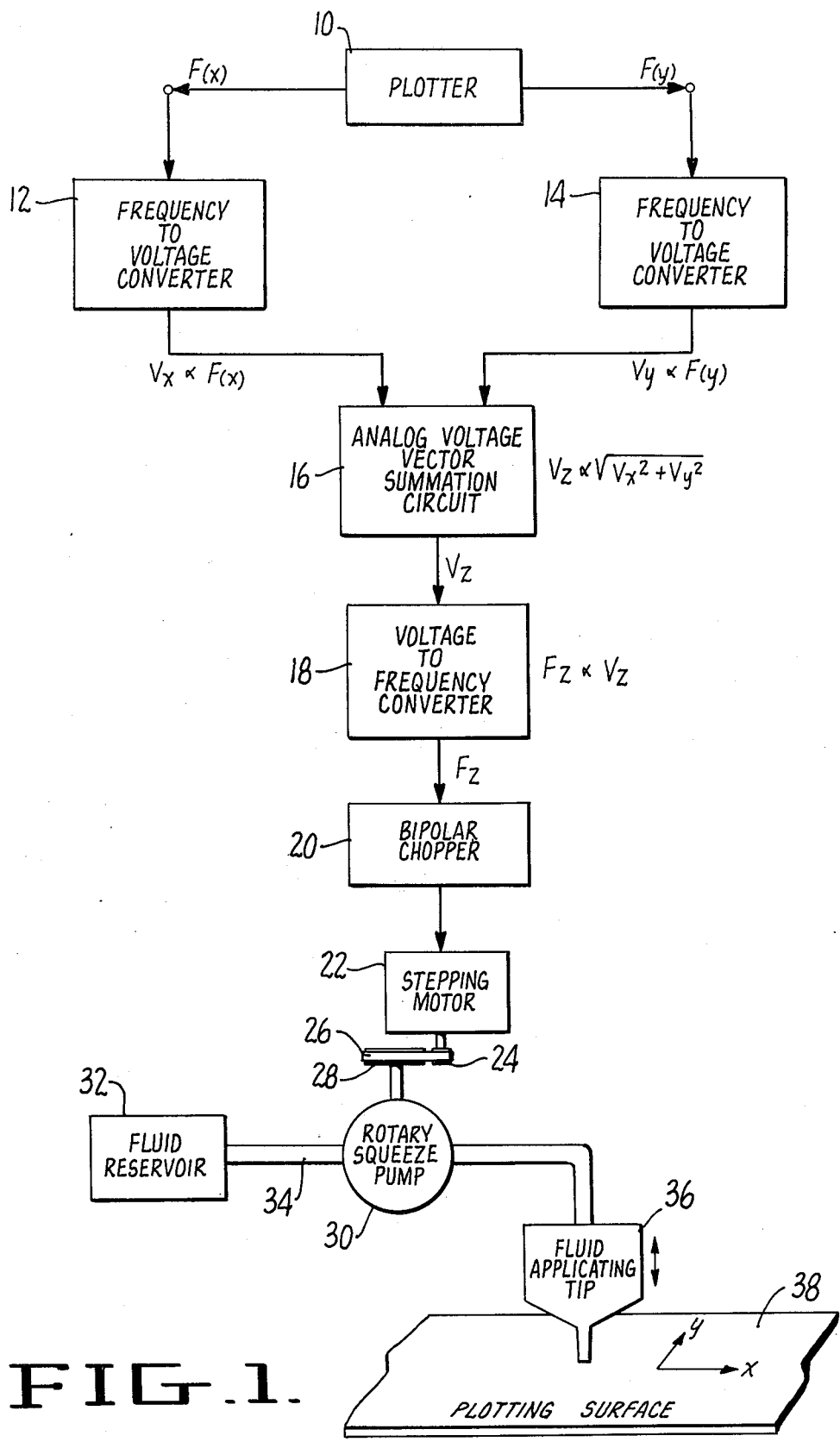
FIG. 1 is a diagrammatic illustration of the fluid applicating device according to one embodiment of the invention.

Referring now more particularly to the block diagram of FIG. 1, two digital pulse trains having frequencies $F(x)$ and $F(y)$ are supplied from a plotter 10 to separate frequency to voltage converters 12 and 14, respectively. The frequencies $F(x)$ and $F(y)$ of the digital pulse trains are representative of the pen velocity in the X and Y orthogonal directions, respectively, and the frequency to voltage converters 12 and 14 generate separate output voltages $V_x$ and $V_y$, respectively, whose magnitudes are proportional to the frequencies $F(x)$ and $F(y)$. Thus, the two voltages $V_x$ and $V_y$ are generated such that the magnitude of $V_x$ is proportional to the pen velocity in the X direction and the magnitude of $V_y$ is proportional to the pen velocity in the Y direction. The signals $V_x$ and $V_y$ are supplied to a single analog voltage vector summation circuit 16. The vector summation circuit 16 generates an output voltage $V_z$ whose magnitude is equal to the square root of the quantity $(V_x)$ squared plus $(V_y)$ squared; that is:

$$V_z = \sqrt{(V_x)^2 + (V_y)^2}.$$

The details of the frequency to voltage converters and the vector summation circuit are not described since these items are ready made and available from commercial sources. The vector summation circuit, for example, may be vector module VM 101 manufactured by Intronics Co.

The voltage $V_z$ is scaled and fed into a voltage to frequency converter 18 which generates a digital pulse train whose frequency $F_z$ is proportional to the magnitude of $V_z$. The signal having a frequency $F_z$ is fed to a bipolar chopper driver circuit 20. The bipolar chopper driver circuit 20 controls the operation of a 400 steps per revolution stepper motor 22. The bipolar chopper circuit divides the signal $F_z$ into several signals having the proper phasing and delivers these driver signals to the separate winding coils of the stepper motor 22 in order to cause its output driving gear 24 to turn through a predetermined number of degrees for each pulse of the pulse train $F_z$. The stepper motor 22 mechanically locks when no signals are being supplied to it. This feature helps control fluid flow and overshoot without the need for a feedback loop.

The output driving gear 24 of the stepper motor 22 is connected by means of a toothed belt 26 to a gear 28 mounted on the drive shaft of a rotary squeeze pump 30. As will be explained in greater detail hereinafter in reference to FIG. 2, the rotary squeeze pump 30 presses fluid in a tube 32 from a fluid reservoir 34 to a fluid applicating tip 36. The fluid applicating tip 36 is moved by means of the X–Y plotter (not shown) over a plotting surface 38.

Figure 2:
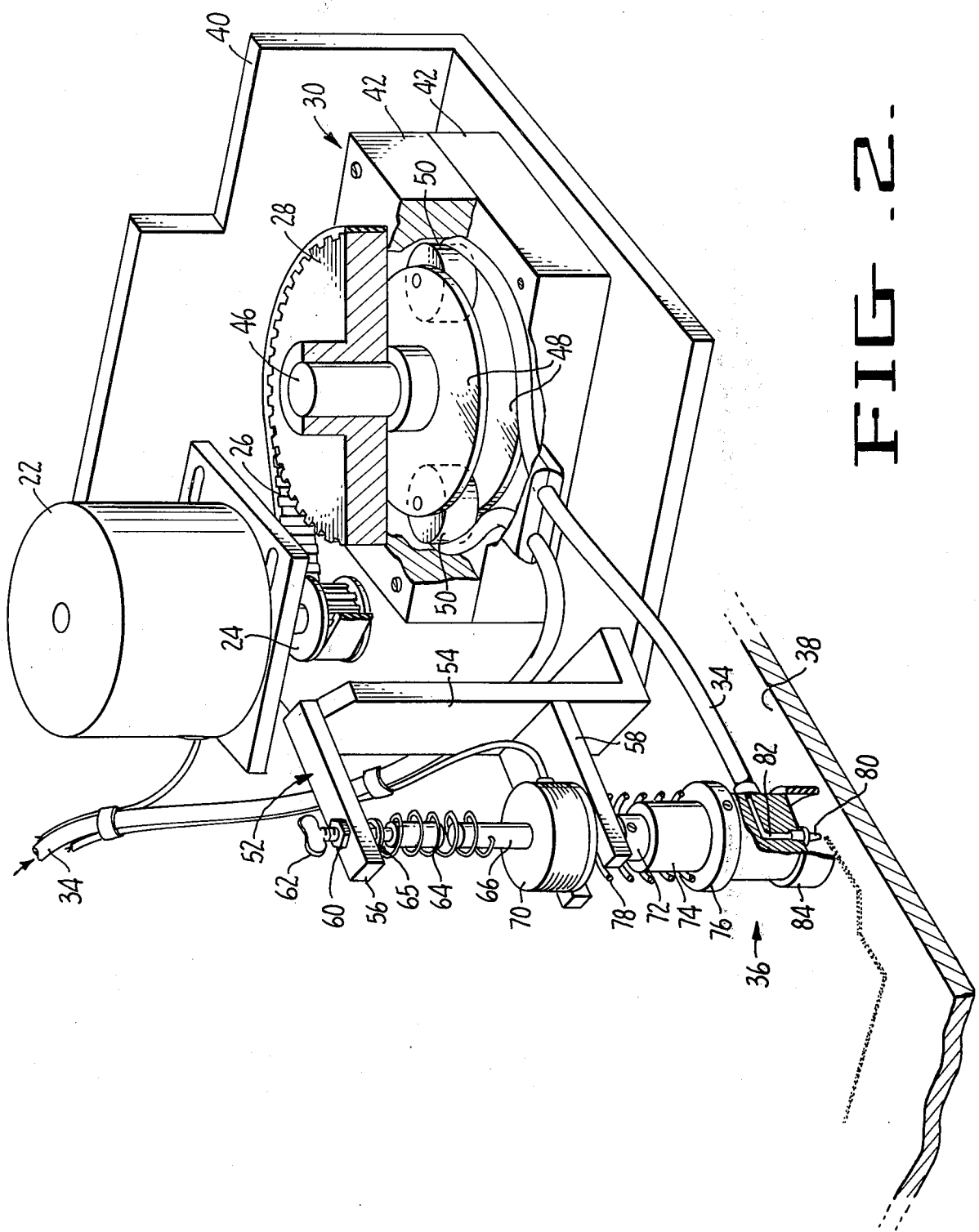
FIG. 2 is a perspective view partially in section and with portions broken away of the fluid applicating device of the embodiment of FIG. 1.

Referring now more particularly to FIG. 2, the fluid applicating mechanism is shown in more detail. The pump 30, the stepper motor 22 and the fluid applicating tip 36 is mounted on a frame 40 which is L-shaped and attached to the moving portion of a controlled positioning system such as an X-Y plotter (not shown). The pump 30 includes a hollow casing 42 which is divided into two halves. Within the hollow casing 42 the tube 34 rests within a groove 44 which is of a generally circular shape. The pump driving gear 28 is fitted upon a shaft 46 which is rotatably mounted within the casing 42. A pair of parallel and spaced apart discs 48 are mounted on the shaft 46 within the hollow casing 42. Mounted at the outer periphery of the discs 48 are three rollers 50 (spaced 120° apart) which bear against the portion of the tube 34 seated in the groove 44. The purpose of the rollers 50 is to compress the portion of the tube 44 with which they are in contact and to thereby urge a measured amount of fluid within the tube 34 between the rollers 50 towards the fluid applicating tip 36 as the shaft 46 and the disc 48 rotate, as for example, in a clock-wise direction as viewed in FIGS. 2 and 3A.

The advantages of using a toothed timing belt 26 are that it isolates the pump 30 from any vibration originating from the stepper motor 22 and also allows for a convenient change of the drive ratio between the stepper motor and the pump 30 by merely changing one of the driving gears 24 or 28 and the belt 26. The advantages of the rotary squeeze pump over other types of pumps are its simplicity and the fact that one continuous tube connects the reservoir to the fluid tip thereby eliminating any air leakage problems which might occur in other types of pumps. Furthermore, this type of pump operates with very little fluid pulsation. The fluid drive is also positive no matter how fast the pump is turned which results in nearly instant response without regard to the viscosity of the fluid.

The materials for the tube 34 are chosen to accommodate the chemical composition of the fluid which is to be applied to the plotting surface. For many types of applications a polyvinylidene chloride type plastic may be suitable. After leaving the pump 30, the fluid tube 34 connects to the fluid applicating tip assembly 36. The portion of the tube 34 extending from the pump 30 to the applicating tip assembly 36 should be kept as short as possible to minimize lag times due to fluid compressibility so that the flow at the tip corresponds to the stepper motor drive motion. Furthermore, all fluid passages ahead of the squeeze roller 50 of the pump 30 should be kept as low to the plotting surface as possible to minimize fluid head effects on the flow.

Referring now more particularly to FIGS. 2 aand 4, the fluid applicating tip assembly will be described in greater detail. The fluid applicating tip 36 is mounted vertically in a bracket 52 attached to the bracket 40. The bracket 52 includes a vertical arm 54 and a pair of upper and lower horizontal arms 56 and 58, respectively. A threaded shaft 60 having a wing knob 62 at its uppermost end extends downwardly through a hole in the arm 56. A tension spring 64 has one end fitted in a nut 65 threaded on the shaft 60 and its other end fitted through a horizontal bore in a movable shaft 66. The lower end of the threaded shaft 60 limits the vertical travel of the movable shaft 66. The vertical position of shaft 60 is adjusted by means of a nut 68 threaded on the shaft 60 between the wing knob 62 and the upper surface of the horizontal leg 56. The nut 65 threaded onto the shaft 60 allows the tension in the spring 64 relative to the movable shaft 66 to be adjusted. By turning the nut 65 in the conventional direction the spring end is raised vertically and the tension in the spring 64 is increased. The tension may be decreased by turning the nut 65 in the opposite direction. The movable shaft 66 passes through a solenoid coil 70 which rests upon the horizontal leg 58. The shaft 66 is made of a ferromagnetic material. Beneath the solenoid coil 70 and attached to the lower end of the shaft 66 is a plunger 72. The plunger 72 is demensioned so as to have a sliding fit within a bore in a fluid applicating head assembly 74.

The head assembly 74 is generally circular in shape and has an exterior projecting shoulder 76 at approximately its midpoint. A coil spring 78 is fitted about the head assembly 74 and extends between the bottom of the solenoid coil 70 and the shoulder 76 to exert a downward force on the head assembly 74. When the solenoid coil 70 is de-energized the movable shaft 66 and the plunger 72 are drawn upwardly against the force of the spring 78 to lift the head assembly 74 and thus the fluid applicating tip 80 off of the plotting surface 38. The upward force lifting the head assembly 74 is generated by the tension spring 64. The head assembly 74 can slide up and down over the plunger 72 to a limited extent as the head assembly moves over the uneven plotting surface 38 while maintaining a gentle pressure of the applicating tip 80 against the plotting surface 38.

The fluid applicating pen tip 80 is mounted in the center of the bottom of the head assembly 74. The pen tip 80 is hollow and is connected through a fluid passage 82 in the head assembly 74 to the tube 34. A circular skirt 84 encircles the bottom of the head 74 and provides a hollow space around the pen tip 80 and below the head assembly 74. In one embodiment, the hollow space created by the skirt 84 communicates with an air passage 86 in the head assembly 74 which is connected through a tube 88 to a source of hot air under slight pressure to speed up drying (not shown). In other embodiments, the head assembly 74 rides on a cushion of air over the plotting surface 38 and thus is slightly levitated from the plotting surface 38. The air is supplied through the tube 88 and the passage 86 from an external source (see FIG. 3). In other embodiments the head assembly 74 has superconductive electomagnetic coils wrapped around it and the plotting surface is made of a thick, non-ferrous, electrically conductive material. The superconducting coils then generate a reverse magnetic field due to eddy currents in the plotting surface in a manner well known to those skilled in the technology of superconductor-magnetism. This reverse magnetic field repels the magnetic field created by the superconductive electromagnets and thus provides a levitating force which raises the head assembly 74 and the pen tip 80.

Figure 4:
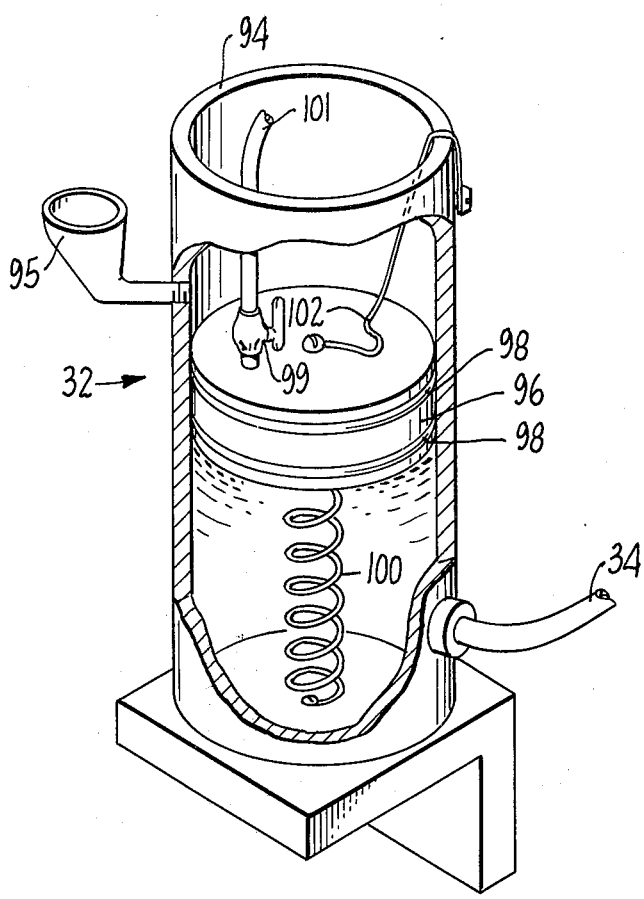
FIG. 4 is an enlarged perspective view partly in section and with portions broken away of the fluid reservoir of the fluid applicating device of the embodiment of FIG. 1.

Referring again to the assembly depicted in FIG. 4 the plunger 72 is loosely fitted to the head 74 by means of a set screw 90 within the shoulder 76 which engages a groove 92 in the plunger 72. In operation the tip 80 rides on the plotting surface 38 as the assembly is moved by the X-Y plotter. The outside diameter of the pen tip 80 spreads the ink as it comes out and thereby dictates the final line width. When the positioning system moves the fluid applicating assembly but it is desired that no lines be plotted (commonly called "dryhaul"), the entire applicating tip assembly is lifted from contact with the plotting surface 38 by de-energizing the solenoid coil 70 with a software generated lift signal from the X-Y plotter (not shown). This is done in addition to stopping the action of the pump 30. It is necessary to lift the applicating pen tip 80 so that no fluid is drawn from it by capillary action.

Referring now more particularly to FIG. 4, one embodiment of the reservoir 32 is illustrated. The reservoir 32 may preferably be mounted on the X-Y positioning head of the plotter and adjacent to the bracket 40 but it can also be mounted remotely. When mounting the reservoir near the pen tip head on the X-Y plotter mechanism a collapsing reservoir may be used which minimizes the chance for air bubbles to be introduced into the system. Such a reservoir 32 includes a hollow cylinder 94 within which a piston 96 is slidably mounted. The piston 96 is fitted with O-rings 98 which maintain a seal against the interior walls of the hollow cylinder 94. A tension spring 100 tends to gently pull the piston 96 downwardly to the closed bottom end of the cylinder 94. The supply tube 34 communicates with the interior portion of the cylinder 94 between its bottom and the undersurface of the piston 96. A string 102 is connected to the top surface of the piston 96 and may be used to withdraw the piston 96 from the hollow interior of the cylinder 94. This hollow interior is filled through a filling funnel 95 with the fluid to be applied to the plotting surface and the piston head 96 is then inserted above it into the hollow of the cylinder 94. As the fluid is withdrawn through the tube 34 by the action of the pump 30, the piston 96 moves downwardly and prevents any more air from entering the system.

A passage (not shown) through the thickness of the piston 96 is connected to an external tube 101 through a valve 99. The passage, tube 101 and valve 99 combination allows air to be bled out of the hollow interior of the cylinder 94 after the reservoir has been filled with fluid. It also allows unused fluid to be salvaged.

Figure 5:
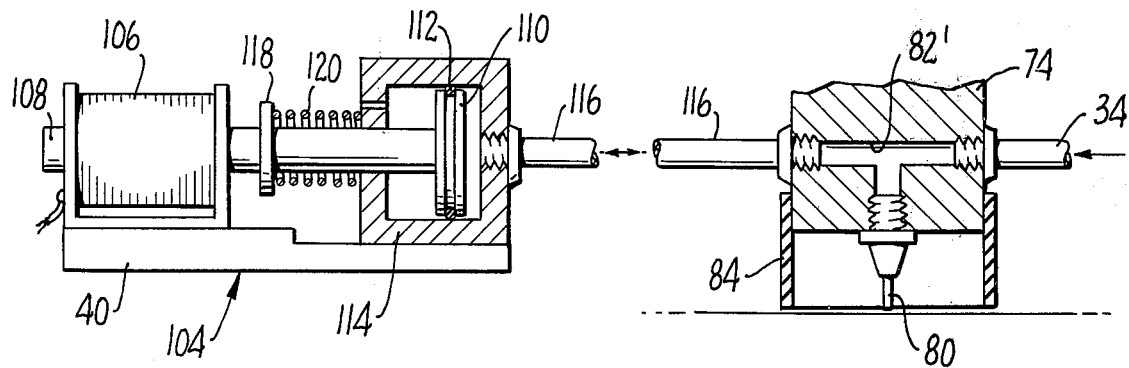
FIG. 5 is a vertical view partially in section of a fluid flow booster adapter for the fluid applicating device of the embodiment of FIG. 1.

Referring now more particularly to FIG. 5, a modification of the embodiment of FIG. 1 is illustrated. In this modification, a fluid flow booster 104 is added. The booster 104 includes a solenoid coil 106 mounted on the frame 40. A plunger shaft 108 extends through the solenoid coil 106 and has an enlarged piston head 110 at one end. The outer peripheral edge of the circular piston head 110 is fitted with an O-ring seal 112 which bears against the interior surface of a closed, circular chamber 114. The effect of the seal 112 and the piston 110 is to divide the chamber 114 into two parts. The portion of the chamber 114 which is furthest away from the solenoid 106 communicates with a hollow tube 116 which, in turn, communicates with a "T" shaped fluid passage 82' in the head assembly 74. The passage 82' is connected to the pen tip 80 and the fluid supply tube 34. The plunger shaft 108 is fitted with a shoulder 118 between the exterior of the chamber 114 and the solenoid 106. A compression spring 120 exerts an outward restraining force against the shoulder 118 to push the plunger 108 towards the solenoid and away from the chamber 114.

In operation, the portion of the chamber which communicates with the fluid tube 116 is normally filled with fluid due to the pressure developed by the rotary pump 30. When the pen tip 80 first starts to move, the solenoid 106 is actuated by the plotter circuitry to extend the plunger 108 and the piston head 110 toward the tube 116. This gives a boost of fluid to the pen tip 80 at the start of its movement. When the pen tip finally comes to rest, the solenoid is de-energized under the control of the plotter circuitry and the piston head 110 is withdrawn due to the action of the spring 120. This relieves the fluid pressure applied to the tube 116 and actually tends to suck ink back up into the pen tip 80, thereby preventing dribbling due to capillary action or fluid compressibility.

Figure 6:
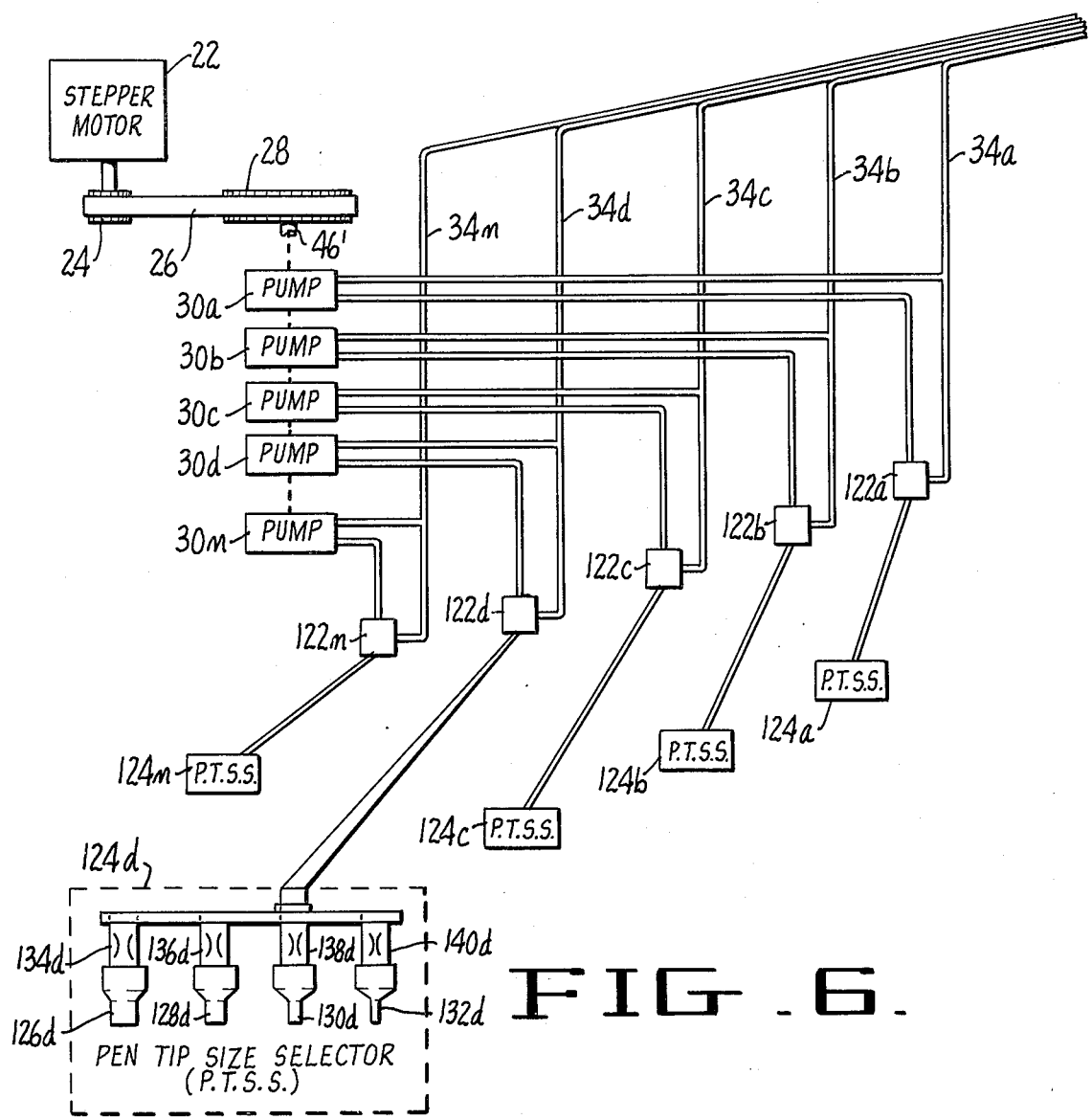
FIG. 6 is a schematic diagram of a multi-tip modification of the embodiment of FIG. 1.

Referring now more particularly to FIG. 6, a modification of the embodiment of FIG. 1 is illustrated wherein the system is expanded to use multi-sized tips and multi-fluid systems. In this embodiment the stepper motor 22 simultaneously drives a plurality of pumps $30a$, $30b$, $30c$, $30d$, .... $30n$, connected to a common shaft 46'. The inputs to the pumps $30a$ - $+n$ are connected by separate fluid tubes $34a$, $34b$, $34c$, and $34d$ to separate remote fluid reservoirs (not shown). The outlets of the pumps $30a$, $30b$, $30c$, $30d$, .... $30n_n$ are connected to separate, remotely actuated valves $122a$, $122b$, $122c$, $122d$, .... $122n$, respectively. The remotely actuated valve switches $122a$ - $122n$ divert the flow either to separate pen tip size selector (PTSS) units $124a$, $124b$, $124c$, $124d$, .... $124n$ or to the respective inlets of the pumps $30a$ - $30n$ when a particular PTSS unit is not being used. Each PTSS unit contains a plurality of pen tips of different sizes. Since all of the PTSS units are substantially similar in construction only one such unit will be described in detail.

The PTSS unit $124d$ includes pen tips $126d$, $128d$, $130d$ and $132d$. Each pen tip $126d$ - $132d$, inclusive, is connected to the remotely actuated valve switch $122d$ through a separate fluid resistor $134d$, $136d$, $138d$ and $140d$, respectively, to compensate for the rate of fluid flow from the pump $30d$ which is the same for all of the pen tips $126d$ - $132d$. The fluid resistors, in effect, scale the flow rate for the width of each pen tip. In one embodiment the different size fluid tips of each PTSS unit can be rotated into a single operative position either manually or automatically. The different tips can also be moved linearly or in other axis directions. In still other embodiments the width of the drawing end of the fluid applicating tip is itself variable to generate lines of different widths so that only one tip need be used which can be varied in size.

The purpose of having different pumps is so that different types of fluids may be employed, as for example, fluids of different viscosities or colors. In some embodiments of a multi-fluid applicating system utilizing separate pumps, the total pump torque required can be minimized by disengaging the pumps which are not being used. This can be done either manually, such as by removing the outer tube housing of the squeeze pumps and lifting out the tubes or it can be done mechanically by electromagnetically operated clutches. Furthermore, in still other embodiments only a single PTSS unit is used, with each pen tip being connected through a separate remotely actuated valve to a separate pump outlet. In this embodiment no compensating fluid resistors are necessary because each pump is specially designed to provide a variable flow rate scaled to the width of the particular pen tip to which it is connected.

While the proportion or fixed relationship between the fluid flow rate and the applicating tip velocity has been described above as substantially directly proportional, in other embodiments other fixed relationships or proportionalities can be utilized such as a non-linear relationship, for example. In these embodiments the proportion of flow rate to tip velocity is altered from that described above by introducing offset voltages to the frequency-to-voltage converters 12 and 14 or to the vector summation circuit 16 or by electronically scaling the output of the vector summation circuit 16. Still other changes to the electronic circuitry to achieve alterations of this proportionality factor will be apparent to those skilled in the electronic art.

Figure 7:
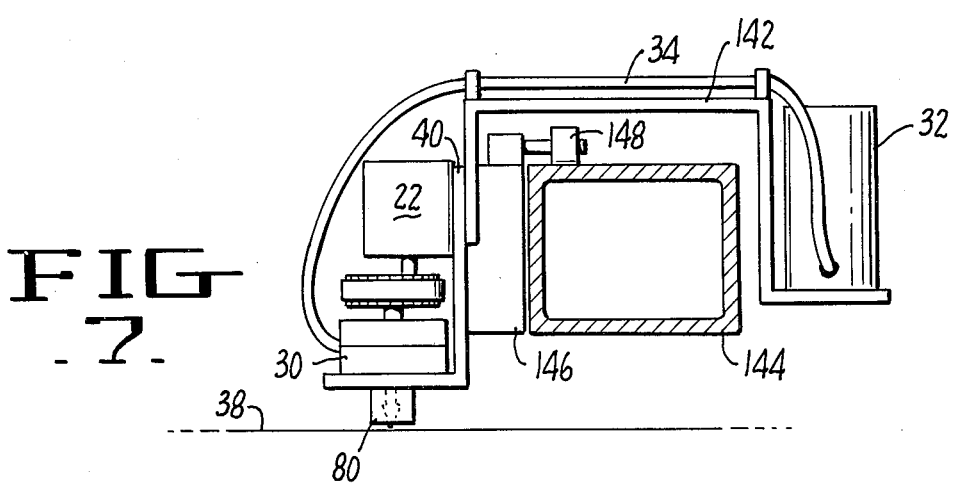
FIG. 7 is a vertical view, partially in cross-section, of a counterbalanced mounting mechanism for the embodiment of FIG. 1.

Referring now more particularly to FIG. 7, a mounting for the fluid applicating device of the invention is illustrated. In this embodiment, the frame 40 carrying the motor 22, the pump 30, and the fluid applicating tip 80 is attached to a downwardly extending leg of an inverted U-shaped member 142 whose horizontal portion passes over a Y-beam 144 of the X–Y plotter. The reservoir 32 is attached to the other downwardly extending leg of the inverted U-shaped frame 142 opposite to the frame 40 on the other side of the beam 144. The flow tube 34 is connected between the reservoir and the pump 30. The portion of the downwardly extending leg of the frame 142 which is attached to the frame 40 is also attached to a Y axis motor 146. The Y axis motor rides on a Z axis roller 148 which rolls on the top surface of the beam 134. An air bearing interface exists between the casing of the Y axis motor 146 and the left vertical side of the vertical beam 144 as viewed in FIG. 7. The purpose of this arrangement is to use the fluid reservoir 32 as a counter-balance to the motor, pump and fluid applicating tip assembly.

While the invention has been described above with reference to applying ink type fluids, it should be understood that in other embodiments other types of fluids such as glue, solder fluxes, liquid plastics, hardeners, acids, etches, dyes, and liquid metals, for example, may be applied to the plotting surface by the fluid applicating device of the invention.

Although the fluid pump 30 has been described as a rotary squeeze pump, in other less advantageous embodiments the pump 30 may be replaced by a magnetostrictive fluid flow tube. In such embodiments the tube would be made of a flexible non-magnetic material, such as aluminum, for example, and would have wound upon it separate electromagnetic coils which would sequentially receive pulses of electric current at a frequency proportional to or in a fixed relationship to the velocity of the fluid applicating tip. This sequential application of current to the coils wrapped around the tube would produce a "milking" effect which would, in turn, drive a fluid containing special ferromagnetic elements within the tube at a rate proportional to or in a fixed relationship to the applicating tip velocity (by means of varying the frequency of the coil currents). The special ferromagnetic elements in the fluid would have to be a homogeneous mixture of material which would be driven by the magnetic polarity produced by the coil. This latter embodiment is limted in application since not all fluids can be prepared in this form. In still other embodiments such a special fluid mixture would not be necessary because the coil used would be made to contract when electric current is applied. This would produce a sort of peristaltic fluid flow effect. In all of these embodiments the fluid is supplied to the fluid applicating tip by means responsive to a signal representative of the magnitude of the instantaneous vectorial velocity of the fluid applicating tip on the plotting surface.

The terms and expressions which have been employed here are used as terms of description and not of limitation, and there is no intention, in the use of such terms and expressions, of excluding equivalents of the features shown and described, or portions thereof, it being recognized that various modifications are possible within the scope of the invention claimed.

What is claimed is:

1. An improved fluid applicating device for an automated plotter of the type wherein fluid from a reservoir is applied to a plotting surface through a tip whose position is controlled by a programmed source wherein the improvement comprises means for receiving separate signals $V_x$ and $V_y$ representative of the tip velocity in orthogonal X and Y directions, respectively, means for vectorially summing the signals to produce a vector sum output signal $V_z$ whose magnitude is proportional to the square root of the sum of the squares of the signals $V_x$ and $V_y$, voltage-to-frequency convertor means responsive to the vector sum output signal $V_z$ for generating a digital pulse train driving signal whose frequency is proportional to the magnitude of the output signal $V_z$, means responsive to digital pulse train driving signal for producing stepper motor driving signals, and motor driven pump means responsive to the stepper motor driving signals for positively supplying fluid from the reservoir to the tip at a flow rate substantially in a fixed relationship to the vector velocity of the movement of the tip over the plotting surface.

2. An improved fluid applicating device as recited in claim 1 wherein the motor driven pump means comprises a self-locking stepper motor driven by the stepper motor driving signal, a rotary squeeze pump driven by the stepper motor, and a flexible conduit which passes through the squeeze pump and connects the tip to the reservoir.

3. An improved fluid applicating device as recited in claim 2 further comprising a plurality of rotary squeeze pumps driven by the stepper motor, a plurality of pen tips of different sizes and valve means for selectively connecting each pump with a corresponding separate pen tip.

4. An improved fluid applicating device for an automated plotter of the type wherein fluid from a reservoir is applied to a plotting surface through a tip whose position is controlled by a programmed source wherein the improvement comprises a plurality of tips of varying sizes, means for receiving separate signals $V_x$ and $V_y$ representative of the velocity of a selected tip in orthogonal X and Y directions, respectively, means for vectorially summing the signals to produce a vector sum output signal $V_z$ whose magnitude is proportional to the square root of the sum of the squares of the signals $V_x$ and $V_y$, means responsive to the vector sum output signal $V_z$ for positively supplying fluid from the reservoir at a flow rate substantially in a fixed relationship to the vector velocity of the movement of the selected tip over the plotting surface, and means for mounting the tips and selectively connecting the means responsive to the vector sum signal for supplying fluid from the reservoir to a separate, selected tip.

5. An improved fluid applicating device for an automated plotter of the type wherein fluid from a reservoir is applied to a plotting surface through a tip whose position is controlled by means of separate digital pulse trains, whose frequencies are separately proportional to the tip velocity over the plotting surface in the X and Y directions, from a programmed source wherein the improvement comprises separate frequency-to-voltage convertors for receiving and converting the separate digital pulse trains into separate output signals $V_x$ and $V_y$ whose magnitudes are each proportional to the frequency of a separate one of the pulse trains, means for vectorially summing the $V_x$ and $V_y$ signals to produce a vector sum output signal $V_z$ whose magnitude is representative of the square root of the sum of the squares of the signals $V_x$ and $V_y$, voltage-to-frequency converter means responsive to the vector sum output signal for generating a digital pulse train driving signal whose frequency is proportional to the magnitude of the output signal $V_z$, means responsive to digital pulse train driving signals for producing stepper motor driving signals, and motor driven pump means for positively supplying fluid from the reservoir to the tip at a flow rate substantially in proportion to the vector velocity of the movement of the tip over the plotting surface, the motor driven pump means including a self-locking stepper motor driven by the stepper motor driving signal, a rotary squeeze pump driven by the stepper motor, and a flexible conduit which passes through the squeeze pump and connects the tip to the reservoir.

\* \* \* \* \*